United States Patent Office 2,729,677
Patented Jan. 3, 1956

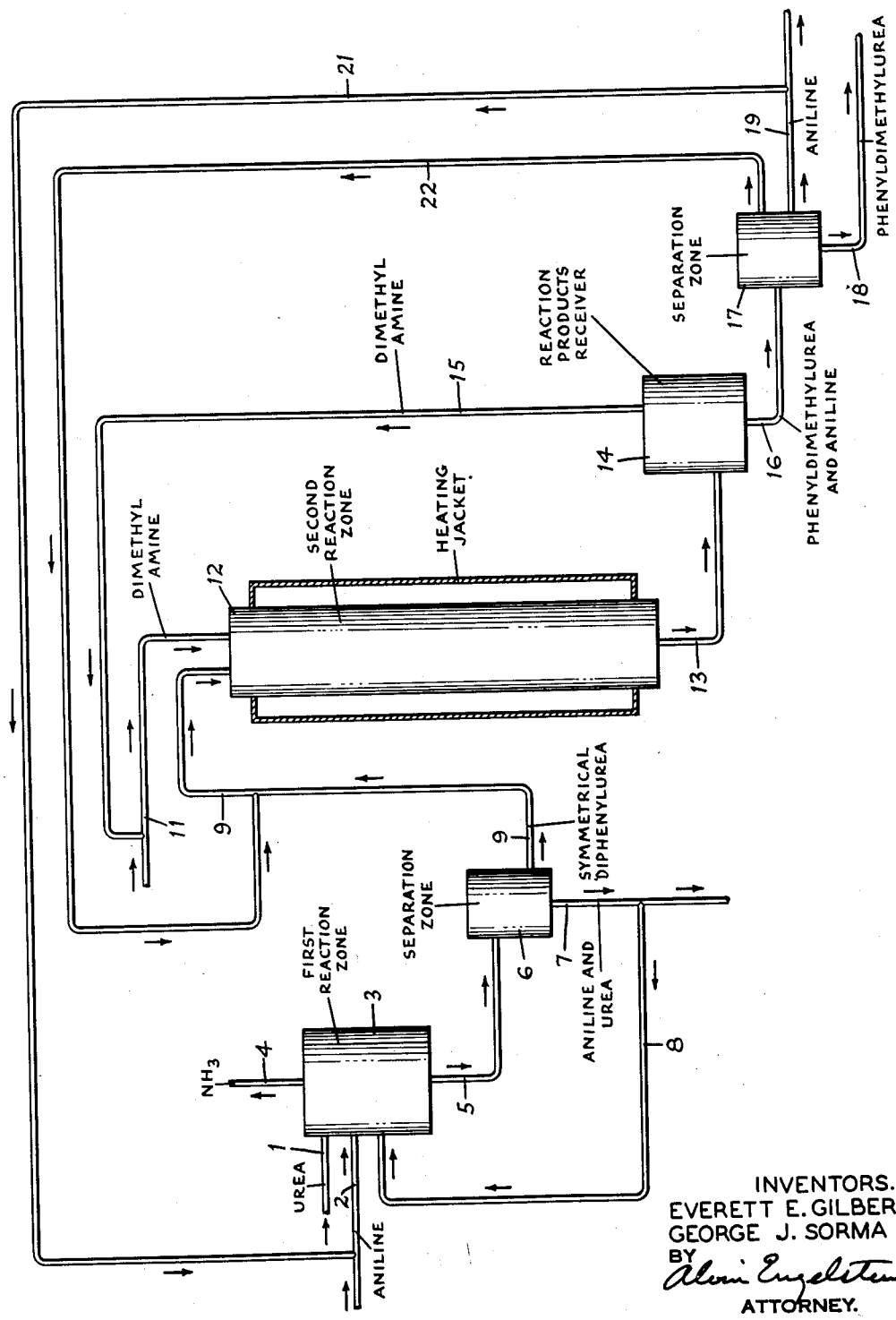

2,729,677
PROCESS FOR THE MANUFACTURE OF SUBSTITUTED UREAS

Everett E. Gilbert and George J. Sorma, Flushing, N. Y., assignors to Allied Chemical & Dye Corporation, New York, N. Y., a corporation of New York Application March 16, 1954, Serial No. 416,538

8 Claims. (Cl. 260—553)

This invention relates to substituted ureas and more particularly refers to a new and improve method for the manufacture of unsymmetrically substituted ureas having a nitrogen bonded to a cyclic hydrocarbon radical and the other nitrogen bonded to an aliphatic hydrocarbon radical.

Unsymmetrically substituted ureas have found many applications in industry and are particularly useful as herbicides as described in U. S. Patents 2,655,444-5-6-7 issued October 13, 1953 and 2,661,272 issued December 1, 1953. The conventional methods for preparing such ureas involve reacting phosgene with an amine to produce an isocyanate or carbamyl chloride and then reacting the isocyanate or carbamyl chloride with another amine to produce the unsymmetrically substituted urea. The two methods designated A and B are illustrated by the following sets of equations:

A $RNH_2 + COCl_2 \rightarrow RNHCONHR'$       Step I
$RNCO + R'NH_2 \rightarrow RNHCONHR'$       Step II

B $(R')(R'')NH + COCl_2 \rightarrow (R')(R'')NCOCl + HCl$   Step I
$RNH_2 + (R')(R'')NCOCl \rightarrow RNHCON(R')(R'') + HCl$
                                                    Step II It is therefore seen that the two prior art methods use phosgene as a raw material, since, the most usual method of preparing isocyanate, as in method A, is by treatment of a primary amine with phosgene, and this also applies to preparation of the carbamyl chloride used in method B.

The use of phosgene in preparing isocyanates and carbamyl chlorides although operated on a commercial scale is objectionable. Phosgene is a gas at room temperature requiring shipment and handling in cylinders under pressure. It is also corrosive and highly toxic to man, having been used as a war gas. Its use to introduce the CO group is relatively inefficient, since most of the weight of the molecule (71.5%) is non-productive chlorine which is eliminated as HCl. This HCl is extremely corrosive, in fact so much so that in a description of the commercial process it is noted that the lead lining of the kettle required repair following manufacture of each 20 tons of isocyanate.

In order to overcome the use of phosgene in the manufacture of the substituted ureas the suggestion was recently made in Patent 2,655,534 issued October 13, 1953 to react two mols of an aliphatic amine with one mol of carbon oxysulfide to produce the alkyl amine salts of N-alkylthiocarbamic acid which latter is in turn reacted with an aromatic amine to produce the unsymmetrically substituted urea as illustrated by the following equations:

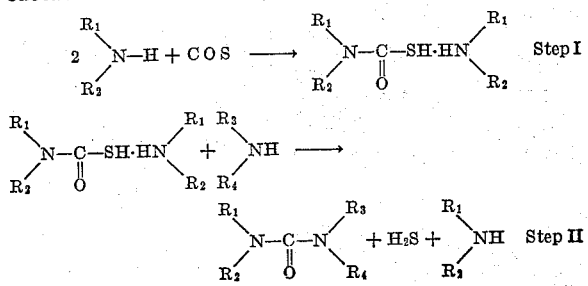

Carbon oxysulfide is a gas, relatively expensive and not a common article of commerce. Further the use of carbon oxysulfide to introduce the CO group is relatively inefficient since a large part of the molecule is non-productive sulfur which is eliminated as H₂S. This H₂S is corrosive, toxic and also creates difficulties in separation of product because the acid hydrogen sulfide reacts with the basic amines in the reaction mixture.

An object of the present invention is to provide a new method for preparing unsymmetrically substituted N-cyclic hydrocarbon-N' aliphatic hydrocarbon ureas and N-cyclic hydrocarbon-N',N' dialiphatic hydrocarbon ureas.

Another object of the present invention is to provide a new method for preparing unsymmetrically substituted ureas without employing acidic substances in a reaction mixture and without generating acidic substances as a result of the reaction.

Other objects and advantages of the present invention will be apparent from the following description and accompanying drawing.

The present invention is particularly concerned with the production of di and tri unsymmetrically substituted ureas having the general formula

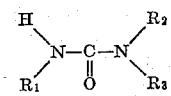

wherein R₁ represents a cyclic hydrocarbon radical which embraces its substitution products, e. g. phenyl, alkyl-phenyl, aralkyl-phenyl, di-phenyl, cyclohexyl, alkyl-cyclo-hexyl, and their halogen substitution products; R₂ represents an aliphatic hydrocarbon radical, preferably having no more than 6 carbon atoms, e. g. methyl, ethyl, propyl, butyl, pentyl, and hexyl; and R₃ represents a group selected from the class consisting of a hydrogen radical and an aliphatic hydrocarbon radical preferably an aliphatic hydrocarbon radical having no more than 6 carbon atoms.

One of the reactants in the process of the present invention is a symmetrical dicylic urea which may be prepared by heating a cyclic amine with urea as shown in the equation immediately below:

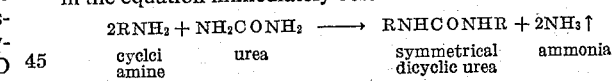

In accordance with the present invention the symmetrical dicyclic urea is admixed with an aliphatic amine and the mixture heated preferably to a temperature in excess of 200° C. for a sufficient length of time to effect conversion of the symmetrical dicyclic urea to unsymmetrically substituted urea as shown by the following equation:

$$RNHCONHR + (R')(R'')NH \rightarrow$$
$$RNHCON(R')(R'') + RNH_2$$

In the above two equations R is a cyclic hydrocarbon radical preferably an aromatic; and R' is an aliphatic hydrocarbon radical preferably methyl, ethyl, propyl; and R'' is hydrogen or an aliphatic hydrocarbon radical preferably methyl, ethyl, or propyl. The term cyclic and aryl as used herein is intended to include its substitution products. A surprising and unexpected result of the reaction of the symmetrical dicyclic urea with an aliphatic amine as illustrated by the equation above is the fact that the aliphatic amine preferentially and almost exclusively substitutes for one cyclic amine attached to the urea with consequent production of high yields of unsymmetrically substituted ureas. The cyclic amine produced by the substitution of the aliphatic amine may of course be recycled for further reaction with urea to produce symmetrical dicyclic urea.

The accompanying drawing is a diagrammatical flow sheet illustrating one method of practicing the invention. Referring to the drawing, urea and aniline are introduced through lines 1 and 2 respectively into reaction zone 3 which may be an empty reaction vessel provided with suitable heating means such as a jacket surrounding the chamber or a coil embodied in the chamber through which a heating medium flows. The proportion of urea and aniline reactants charged into chamber 3 may be varied over a wide range; however we have found it preferable to employ an excess of aniline desirably in the proportion of 6 to 8 mols of aniline per mol of urea. The mixture of aniline and urea is heated with stirring causing formation of symmetrical diphenylurea with the evolution of ammonia which is released from the top of chamber 3 through line 4. Completion of the reaction occurs in about 1–3 hours and is indicated by the reduction or cessation in evolution of ammonia. The reaction may be carried out at temperatures in excess of about 100° C. preferably within the range of 125° to 200° C. Although the reaction may be conducted under superatmospheric or subatmospheric pressures, atmospheric pressure is preferred because it avoids the use of costly pressure equipment or vacuum pumps.

The reaction products consisting principally of symmetrical diphenylurea together with excess aniline and little or no unreacted urea are discharged from the bottom of reaction vessel 3 through line 5 and sent to separation zone 6 wherein if desired the symmetrical diphenylurea may be recovered from the reaction products by any convenient means, as for example by cooling to form a slurry of symmetrical diphenylurea in aniline, filtering the slurry, washing the wet filter cake with methanol and drying the washed filter cake. Additional symmetrical diphenylurea may be recovered from the aniline filtrate by extraction with a solvent miscible with aniline such as trichlorofluoromethane, carbon tetrachloride, benzene, chlorobenzene, xylene, trichlorobenzene, phenylcyclohexane, and dodecylbenzene. Yields of unsymmetrical diphenylurea in excess of 90–95% based upon urea are obtained. The recovered aniline and urea, if any, discharging through line 7 may be returned via line 8 to chamber 3 for further reaction. Separated symmetrical diphenylurea withdrawn from separation zone 6 through line 9 is now ready for further reaction with an aliphatic amine to produce unsymmetrically substituted urea. In the course of our investigation we have found it unnecessary to completely separate the aniline from the symmetrical diphenylurea because surprisingly the action of the aliphatic amine in substituting in the symmetrical diphenylurea is so selective that it is not adversely affected by the presence of excess aniline. Further we have found that excess aniline acts as a solvent and may under some conditions be of benefit in this respect. Accordingly, a mixture of symmetrical diphenylurea and aniline (i. e. without complete separation of aniline from the reaction mixture) may be employed for further reaction with an aliphatic amine.

Symmetrical diphenylurea entering through line 9 and dimethyl amine entering through line 11 are introduced into second reaction zone 12 which may be any suitably heated vessel wherein the reactants are heated to an elevated temperature in excess of about 150–200° C., preferably within the range of 300–500° C. for a sufficient length of time to effect conversion of the symmetrical diphenylurea to unsymmetrical, N-phenyl-N,N'-dimethylurea. Reaction zone 12 may be a conventional empty reaction chamber wherein a batch of reactants is heated to a temperature of about 300° C. preferably under superatmospheric pressure for a period of about 3 hours. When operating in such batch manner the addition of a solvent such as aniline or benzene is desirable. In the preferred method of operation as illustrated in the drawing reaction zone 12 may be a vertical column filled with packing and surrounded with a heating jacket for maintaining the desired temperature in the column. The reactants, namely symmetrical diphenylurea and dimethylamine entering the top of column through respective lines 9 and 11 flow down through heated column 12 maintained at a temperature in excess of 300° C. and during their downward passage the reactants in vapor form produce unsymmetrical phenyldimethylurea. If desired, the reactants may be preheated prior to entering column 12. Column 12 may be conveniently operated at substantially atmospheric pressure; superatmospheric and subatmospheric pressures are unnecessary. Likewise the addition of a solvent to the reactants is unnecessary. Although the proportion of the two reactants entering column 12 may be varied over a wide range we have found it desirable to employ an excess of the dimethylamine to insure more complete consumption of the symmetrical diphenylurea. Further, excess dimethylamine may be much more easily separated from the reaction mixture than unreacted symmetrical phenyldimethylurea. Reaction products discharging from the bottom of column 12 through line 13 into receiver 14 consist principally of phenyldimethylurea, aniline, and excess dimethylamine. In receiver 14 excess dimethylamine in vapor form is separated from liquid phenyldimethylurea and aniline and released through line 15 and returned via line 11 to column 12 for further reaction with symmetrical diphenylurea. Unsymmetrical phenyldimethylurea and aniline together with unreacted symmetrical phenylurea, if any, are withdrawn from the bottom of the receiver 14 and sent via line 16 to separation zone 17 wherein the unsymmetrical phenyldimethylurea is separated from the mixture by any suitable method as for example solvent extraction with a solvent in which the aniline is soluble such as dodecylbenzene or by treatment with hydrochloric acid to form aniline hydrochloride. The phenyldimethylurea product is discharged through line 18. Aniline leaving separation zone 17 through line 19 may be recycled via line 21 and line 2 to first reaction zone 3 for further reaction with urea to form symmetrical diphenylurea. Any unreacted symmetrical diphenylurea recovered may be recirculated via line 22 and line 9 to reaction zone 12 for further reaction with dimethylamine.

From the foregoing it will be evident the sole reactants to the process are common relatively inexpensive materials namely urea, aniline and dimethylamine. Further, none of these reactants and none of the reaction products are corrosive to steel. Also, and of importance, the yield of desired product is very high exceeding 40% on a single pass basis and on a recycle basis exceeding 80–90%. Furthermore because the aliphatic amine reacts almost exclusively to substitute one aromatic amine on the symmetrical urea there is produced a minimum of by-products which simplifies the separation problem and enhances the yield.

The following examples illustrate the present invention:

*Example 1*

Urea and aniline in a proportion of 1 mol to 8 mols of aniline are placed in a reaction chamber and heated with stirring to a temperature of 140–180° C. and maintained at that temperature, about 1½ hours, until there is no further evolution of $NH_3$ from the mixture. The reaction liquid is cooled and the resulting slurry is then filtered. The wet symmetrical diphenylurea is washed with methanol and then dried in an oven at 85° C. A small additional amount of symmetrical diphenylurea is isolated from the methanol wash by slow evaporation of the wash. The yield of symmetrical diphenylurea is 94.1% based upon urea. Symmetrical diphenylurea separated from the reaction mixture is fed together with dimethylurea in the proportion of 1 mol diphenylurea and 5.2 mols dimethylamine into the top of a heated vertical tube, passing down through the vertical tube maintained at 400° C. and discharging from the bottom thereof. The cooled liquid reaction products upon analysis show a conversion of 86% of the symmetrical diphenylurea with a yield of 71% of unsymmetrical substituted phenyldimethylurea based on the symmetrical diphenylurea reacted.

Example 2

Symmetrical diphenylurea produced as described in Example 1 together with dimethylamine in the proportion of 0.95 mol of diphenylurea and 1.34 mols of dimethylamine are passed down through a vertical tube maintained at 420 to 460° C. Symmetrical diphenylurea conversion was 80%, and the yield of unsymmetrically substituted phenyldimethylurea based on reacted symmetrical diphenylurea was 69%.

Example 3

The operation was conducted in manner similar to Example 2 except that the proportion of reactants was varied to 0.67 mol of symmetrical diphenylurea and 2.77 mols of dimethylamine and also the reaction temperature in the vertical tube was maintained at 460° C. Analysis of the resultant reaction products showed a symmetrical diphenylurea conversion of 98%, and a yield of 74% unsymmetrically substituted phenyldimethylurea based on reacted symmetrical diphenylurea.

Example 4

The operation was conducted in manner similar to Example 3 except that the ratio of reactants was 0.50 mol of symmetrical diphenylurea and 2.66 mols of dimethylamine. Symmetrical diphenylurea conversion was 97%, and the yield of unsymmetrically substituted phenyldimethylurea based on reacted symmetrical diphenylurea was 83.4%.

Example 5

0.35 mol symmetrical 4,4'-dichlorodiphenylurea was reacted with 1 mol dimethylamine at a temperature of 420–460° C. In one pass operation there was obtained a 44.9 yield of the desired N-4-chlorophenyl-N',N'-dimethylurea.

Example 6

In an operation conducted in a manner similar to the examples above 0.39 mol symmetrical 2,2'-dimethyldiphenylurea was reacted with 2.8 mols monomethylamine at a temperature of 405–420° C. From resultant reaction products there was recovered the desired N-2-methylphenyl-N'-methylurea.

Although certain preferred embodiments of the invention have been disclosed for purpose of illustration it will be evident that various changes and modifications may be made therein without departing from the scope and spirit of the invention.

We claim:

1. A process for the production of unsymmetrically substituted ureas which comprises maintaining a mixture of urea and a primary cyclic hydrocarbon amine wherein the cyclic hydrocarbon radical of said amine is selected from the group consisting of phenyl, alkyl-phenyl, aralkyl-phenyl, di-phenyl, cyclohexyl, alkyl-cyclohexyl, and their halogen substitution products for a sufficient length of time to produce symmetrically substituted cyclic hydrocarbon urea at a temperature between above about 100° C. and below the temperature at which substantial decomposition of the symmetrically substituted hydrocarbon urea occurs; admixing an alkyl amine having hydrogen and at least 1 and not more than 2 alkyl radicals attached to the nitrogen of said amine and each said alkyl radical having no more than 6 carbon atoms with the symmetrically substituted cyclic hydrocarbon urea; maintaining the mixture for a sufficient length of time to effect conversion of the symmetrically substituted cyclic hydrocarbon urea to an unsymmetrically substituted urea having a cyclic hydrocarbon radical attached to one nitrogen and at least one alkyl radical attached to the other nitrogen of the urea at a temperature between above about 150° C. and below temperature at which substantial decomposition of the unsymmetrically substituted urea occurs and recovering said unsymmetrically substituted urea.

2. A process for the production of unsymmetrically substituted ureas which comprises maintaining a mixture of urea and a primary aryl amine for a sufficient length of time to produce symmetrically substituted diaryl urea at a temperature between above about 100° C. and below the temperature at which substantial decomposition of the symmetrically substituted diaryl urea occurs; admixing an alkyl amine having hydrogen and at least 1 and not more than 2 alkyl radicals attached to the nitrogen of said amine and each said alkyl radical having no more than 3 carbon atoms with the symmetrically substituted diaryl urea; maintaining the mixture for a sufficient length of time to effect conversion of the symmetrically substituted diaryl urea to an unsymmetrically substituted urea having an aryl radical attached to 1 nitrogen and at least 1 alkyl radical attached to the other nitrogen of the urea at a temperature between above about 150° C. and below the temperature at which substantial decomposition of the unsymmetrically substituted urea occurs and recovering said unsymmetrically substituted urea.

3. A process for the production of unsymmetrically substituted ureas which comprises maintaining a mixture of a symmetrically substituted cyclic hydrocarbon urea wherein the cyclic hydrocarbon radical of said urea is selected from the group consisting of phenyl, alkyl-phenyl, aralkyl phenyl, di-phenyl, cyclohexyl, alkyl-cyclohexyl, and their halogen substitution products and an alkyl amine having hydrogen and at least 1 and not more than 2 alkyl radicals attached to the nitrogen of said amine and each said alkyl radical having no more than 6 carbon atoms for a sufficient length of time to effect conversion of the symmetrical urea to an unsymmetrically substituted urea having a cyclic hydrocarbon radical attached to one nitrogen and at least one alkyl radical attached to the other nitrogen of the urea at a temperature between above about 150° C. and below the temperature at which substantial decomposition of the unsymmetrically substituted urea occurs and recovering said unsymmetrically substituted urea.

4. A process for the production of unsymmetrically substituted ureas which comprises maintaining a mixture of symmetrically substituted diaryl urea with an alkyl amine having hydrogen and at least 1 and not more than 2 alkyl radicals attached to the nitrogen of said amine and each said alkyl radical having no more than 3 carbon atoms for a sufficient length of time to effect conversion of the symmetrically substituted diaryl urea to an unsymmetrically substituted urea having an aryl radical attached to 1 nitrogen and at least 1 alkyl radical attached to the other nitrogen of the urea at a temperature between above about 150° C. and below the temperature at which substantial decomposition of the unsymmetrically substituted urea occurs and recovering said unsymmetrically substituted urea.

5. A process for the production of unsymmetrically substituted ureas which comprises maintaining a mixture of symmetrical diphenylurea with an alkyl amine having hydrogen and at least 1 and not more than 2 alkyl radicals attached to the nitrogen of said amine and each said alkyl radical having no more than 3 carbon atoms for a sufficient length of time to effect conversion of the symmetrical diphenylurea to an unsymmetrically substituted urea having a phenyl radical attached to 1 nitrogen and at least 1 alkyl radical attached to the other nitrogen of the urea at a temperature between above about 150° C. and below the temperature at which substantial decomposition of the unsymmetrically substituted urea occurs and recovering said unsymmetrically substituted urea.

6. A process for the production of unsymmetrically substituted ureas which comprises maintaining a mixture of a symmetrical dichlorophenylurea with an alkyl amine having hydrogen and at least 1 and not more than 2 alkyl radicals attached to the nitrogen of said amine and each said alkyl radical having no more than 3 carbon atoms for a sufficient length of time to effect conversion of the symmetrical dichlorophenylurea to an unsymmetrically substituted urea having a dichlorophenyl radical attached to 1 nitrogen and at least 1 alkyl radical attached to the other nitrogen of the urea at a temperature in excess of about 150° C. and below the temperature at which substantial decomposition of the unsymmetrically substituted urea occurs and recovering said unsymmetrically substituted urea.

7. A process for the production of unsymmetrical 4-chlorophenyldimethylurea which comprises maintaining a mixture of symmetrical 4,4'-dichlorodiphenylurea and dimethylamine at a temperature between about 300–500° C. for a sufficient length of time to effect conversion of the symmetrical urea to unsymmetrical 4-chlorophenyldimethylurea and recovering the unsymmetrical 4-chlorophenyldimethylurea.

8. A process for the production of unsymmetrically substituted phenyldimethylurea which comprises maintaining a mixture of urea and a molar excess of aniline for a sufficient length of time to effect conversion of the urea and aniline into symmetrical diphenylurea at a temperature in excess of about 100° C. and below the temperature at which substantial decomposition of symmetrical diphenylurea occurs; heating said reaction products together with a molar excess of dimethylamine to a temperature within the range of about 300–500° C.; maintaining said mixture for a sufficient length of time to effect conversion of the symmetrical diphenylurea in the reaction mixture to unsymmetrically substituted phenyldimethylurea; separating unconverted dimethylamine and aniline from the reaction products; recycling aniline for further conversion with urea to produce symmetrical diphenylurea; recycling dimethylamine for further conversion with symmetrical diphenylurea to produce unsymmetrically substituted phenyldimethylurea and recovering unsymmetrically substituted phenyldimethyl urea.

No references cited.